(12) United States Patent
Franke et al.

(10) Patent No.: US 7,774,382 B2
(45) Date of Patent: Aug. 10, 2010

(54) METHOD AND APPARATUS FOR CONFIGURING A CONTROL DEVICE, AND CORRESPONDING CONTROL DEVICE

(75) Inventors: Andreas Franke, Königslutter-Rottorf (DE); Michael Niemetz, Regensburg (DE); Frank Quiesser, Regensburg (DE); Michael Warmuth, Regensburg (DE)

(73) Assignee: Continental Automotive GmbH, Munich (DE)

( * ) Notice: Subject to any disclaimer, the term of this patent is extended or adjusted under 35 U.S.C. 154(b) by 337 days.

(21) Appl. No.: 11/909,486

(22) PCT Filed: Mar. 21, 2006

(86) PCT No.: PCT/EP2006/060899

§ 371 (c)(1),
(2), (4) Date: Sep. 24, 2007

(87) PCT Pub. No.: WO2006/100232

PCT Pub. Date: Sep. 28, 2006

(65) Prior Publication Data

US 2008/0270427 A1  Oct. 30, 2008

(30) Foreign Application Priority Data

Mar. 22, 2005  (DE) .................. 10 2005 013 285

(51) Int. Cl.
*G06F 7/00* (2006.01)
*G06F 17/30* (2006.01)
(52) U.S. Cl. .................. 707/804; 707/812; 701/115
(58) Field of Classification Search ............... 707/1–10, 707/100–104.1, 200–206; 701/1, 29, 35, 701/36, 101, 102, 115
See application file for complete search history.

(56) References Cited

U.S. PATENT DOCUMENTS

| 6,393,342 | B2 | 5/2002 | Bauer et al. |
| 2001/0044677 | A1 | 11/2001 | Bauer et al. |
| 2004/0039500 | A1 | 2/2004 | Amendola et al. |

FOREIGN PATENT DOCUMENTS

| DE | 198 50 454 A1 | 5/2000 |
| DE | 199 63 475 A1 | 7/2001 |
| DE | 199 64 013 A1 | 7/2001 |

(Continued)

OTHER PUBLICATIONS

Mahmood et al., Concurrent error detection using watchdog processors-a survey, 1988, vol. 37, IEEE, 160-174.*

(Continued)

*Primary Examiner*—Jean B Fleurantin
(74) *Attorney, Agent, or Firm*—Laurence A. Greenberg; Werner H. Stemer; Ralph E. Locher

(57) ABSTRACT

The invention relates to a method for configuring a control device and to a corresponding control device. The control device comprises a main memory and a variant memory. A main data record is created in accordance with an identification from a base data record that is specific to said identification and a difference base data record that is likewise specific to said identification. The main data record is then transmitted to a main memory of the control device.

17 Claims, 3 Drawing Sheets

FOREIGN PATENT DOCUMENTS

| | | |
|---|---|---|
| DE | 100 37 397 A1 | 2/2002 |
| DE | 101 53 447 A1 | 5/2003 |
| DE | 102 34 063 A1 | 2/2004 |
| DE | 102 53 765 A1 | 6/2004 |
| GB | 2357859 A * | 4/2001 |
| WO | 2005/006091 A1 | 1/2005 |

OTHER PUBLICATIONS

Schiano et al., Markov models of fault-tolerant memory systems under SEU, 2004, IEEE, 38-43.*

* cited by examiner

METHOD AND APPARATUS FOR CONFIGURING A CONTROL DEVICE, AND CORRESPONDING CONTROL DEVICE

BACKGROUND OF THE INVENTION

Field of the Invention

The invention relates to a method and an apparatus for configuring a control device, in particular a control device of a motor vehicle.

Methods and apparatuses for controlling operating sequences in a motor vehicle are known (DE 199 63 475 A1) whereby control is effected using a data record stored in a memory. Different data records can be selected to enable different control variants to be implemented by different data record variants. For this purpose a basic data record is stored in the memory and is supplemented or modified by data record variants stored in a second memory.

An alternative is known whereby the data records of control units are read into the control unit memory by an external programming device.

Both variants have the disadvantage that the memory content of the control unit can be written only once, or not at all without an external programming device. If changes to the working data record are necessary, programming by an external control device is necessary.

SUMMARY OF THE INVENTION

The object of the invention is to create a method and an apparatus for configuring a control device which also allow a data record to be changed repeatedly even without an external programming device.

This object is achieved by a method as claimed in claim 1 and by a control device as claimed in claim 8.

According to the invention, to configure a control device an identification code is first read in. On the basis of this identification code a working data record is created from a basic data record specific to said identification code and at least one difference data record likewise specific to said identification code. The basic data record and the difference data record are stored in a variant memory. When the working data record has been created, it is transferred to a main memory of the control device.

The control device according to the invention has a main memory for a working data record and a variant memory for a basic data record and at least one difference data record.

The main memory contains a working data record.

The control device according to the invention has a main memory for a working data record and also a variant memory, said variant memory containing a basic data record specific to a particular identification code and at least one difference data record. From the basic data record and the associated difference data record, a working data record can be created. This is transferred to the main memory of the control device if necessary.

The invention additionally includes a computer program which, when run on a computer or computer network, executes the method according to the invention in one of its embodiments.

The invention also comprises a computer program with program coding means for carrying out the method according to the invention in one of its embodiments when the program is run on a computer or computer network. In particular, the program coding means can be stored on a machine readable data carrier.

The scope of the invention also encompasses a data carrier on which is stored a data structure which, when loaded into primary storage or main memory of a computer or computer network, can execute the method according to the invention in one of its embodiments. Likewise within the scope of the invention is a computer program product with program coding means stored on a machine readable data carrier for executing the method according to the invention in one of its embodiments when the program is run on a computer or computer network.

Computer program product is understood as meaning a program as a commercial product. It can basically be provided in any form, such as on paper or on a machine readable data carrier. In particular it can be distributed via a data transmission network.

Advantageous embodiments of the invention are set forth in the subclaims.

In a preferred embodiment of the method according to the invention, the main memory is erased prior to the transfer. Erasure is understood as meaning both erasure of the entire main memory and erasure of individual memory sectors.

In another preferred embodiment, the basic data record and/or the difference data records can be present in compressed form in the variant memory. The latter is/are only decompressed when or shortly before the working data record is created.

This has the advantage that the size of the variant memory can be reduced because of said compression.

The basic data record can likewise access a difference data record, the difference data record then in turn being able to access another difference data record. In addition, a basic data record can also be supplemented by a plurality of difference data records. These two variants of the combination of a basic data record and a plurality of difference data records is understood as a recursive combination.

In another preferred embodiment, a working data record is created in the control device itself. Here it is advantageous that, apart from an identification code and an instruction to exchange the working data record, no additional external data or instructions are required in order to create a new working data record and thus reconfigure the control device.

For example, the working data record of the control device can be adapted to a new vehicle configuration, or control device functions can be additionally enabled.

In another preferred embodiment, error correction can be performed when transferring the working data record from the variant memory to the main memory. This ensures that the new working data record is transferred in an error-free manner to the main memory, where it is then available for operating the control device.

Preferably the content of the main memory and/or of the variant memory can also be compared with a predefined checksum. In this way it can be ensured that the content of the memories also corresponds to the basic and/or difference data records stored there.

The main memory can preferably be an ECC flash memory.

For this device it is advantageous that errors (so-called bit flips) are automatically corrected in the device.

Alternatively the data records can be read into the memory using error correction.

In a preferred embodiment, an initial data record is already stored in the main memory in the initial state. This initial data record allows the control device to be operated even in the as-supplied condition. In another preferred embodiment, this initial data record can be a frequently used working data record.

This initial data record can preferably be a basic data record or a combination of a basic data record and at least one difference data record.

The invention will now be explained in greater detail with reference to exemplary embodiments and the accompanying drawings in which:

DESCRIPTION OF THE INVENTION

Figure 1:
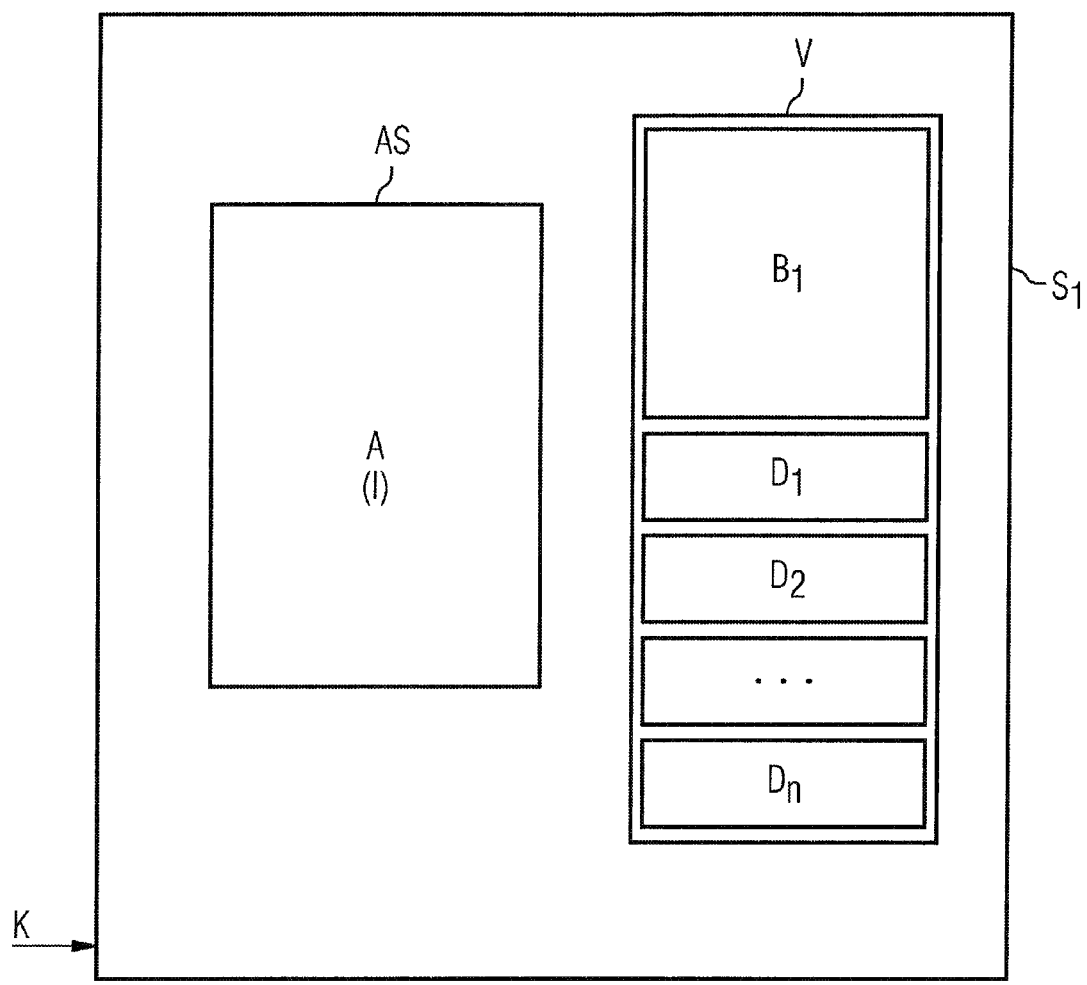
FIG. 1 shows a schematic block diagram of a first embodiment of the control device.

FIG. 1 shows a first example of a control device $S_1$ having a main memory AS and a variant memory V. The main memory contains a working data record A which, in the as-supplied condition, corresponds to an initial data record I. This initial data record I can correspond, for example, to the most frequently required working data record A, so that in the majority of cases no reprogramming of the control device $S_1$ will be necessary.

In one application the control device $S_1$ is a motor vehicle control device in which the working data record A is determined as a function of an equipment variant of the motor vehicle.

Here different variables affect the required working data record A. In the case of a motor vehicle, these are typically the engine variant used and/or the associated characteristic data and functions for ignition, fuel injection and/or transmission control.

If the motor vehicle is now a vehicle for which the initial data record I is unsuitable, a basic data record B and at least one difference data record D is selected from the variant memory on the basis of an identification code specific to that variant, different variants of the basic data records B and of the difference data records D being identified by indices.

The difference data record contains the differences between a basic data record and a working data record variant. The difference data record can in particular contain address information and/or values of the data to be modified.

The basic data records stored here in the variant memory V may correspond either to working data records A or to another part of a working data record A which must be supplemented by a difference data record D.

If a basic data record B corresponds to a complete working data record A, the difference data records D contain information as to where and how the basic data record B must be modified to create the new working data record A.

In order to minimize the size of the variant memory, both the basic data records B and the difference data records D can be present in compressed form. In this case the various data records are decompressed only when or shortly before the working data record is created.

A further advantage of the example described here is that the exchange of the working data record is also suitable for modern flash memory media with error correction. Such storage media have minimum memory units that can be written or erased. The smallest memory unit that can be written, known as a micropage, usually ranges in size from 16 to 128 bytes. The smallest memory unit that can be erased, known as a sector, is generally between 16 and 512 kilobytes.

Because of the error correction and the design of the memory, with these storage media it is not possible to first write a basic data record to the main memory with gaps and fill in these gaps with a difference data record in a subsequent step.

In the method described here, the entire main memory AS or parts of the main memory AS corresponding to a multiple of a memory sector are erased and then written with a new working data record A which in particular corresponds to a combination of a basic data record B and at least one difference data record D.

If the working data record A created is then read into the main memory AS, read-in can take place using an error correction code incorporated in the main memory.

An identification code K for a new variant can be entered e.g. by the user. The identification code can be transferred to the control device S via a keypad as a PIN code, via a radio interface or via an external control and diagnostic device.

Such an identification code K can also be generated by a component itself, e.g. an air-conditioning system or an automatic transmission itself. The majority of these components communicate with the control device S via a bus, e.g. the CAN bus. If such a component is present, this can be checked via a simple CAN message.

If the control device receives its new identification code, the basic data record $B_K$ specific to the identification code K is selected and if necessary combined with the difference data records likewise specific to the code and then transferred to the main memory AS.

Figure 2:
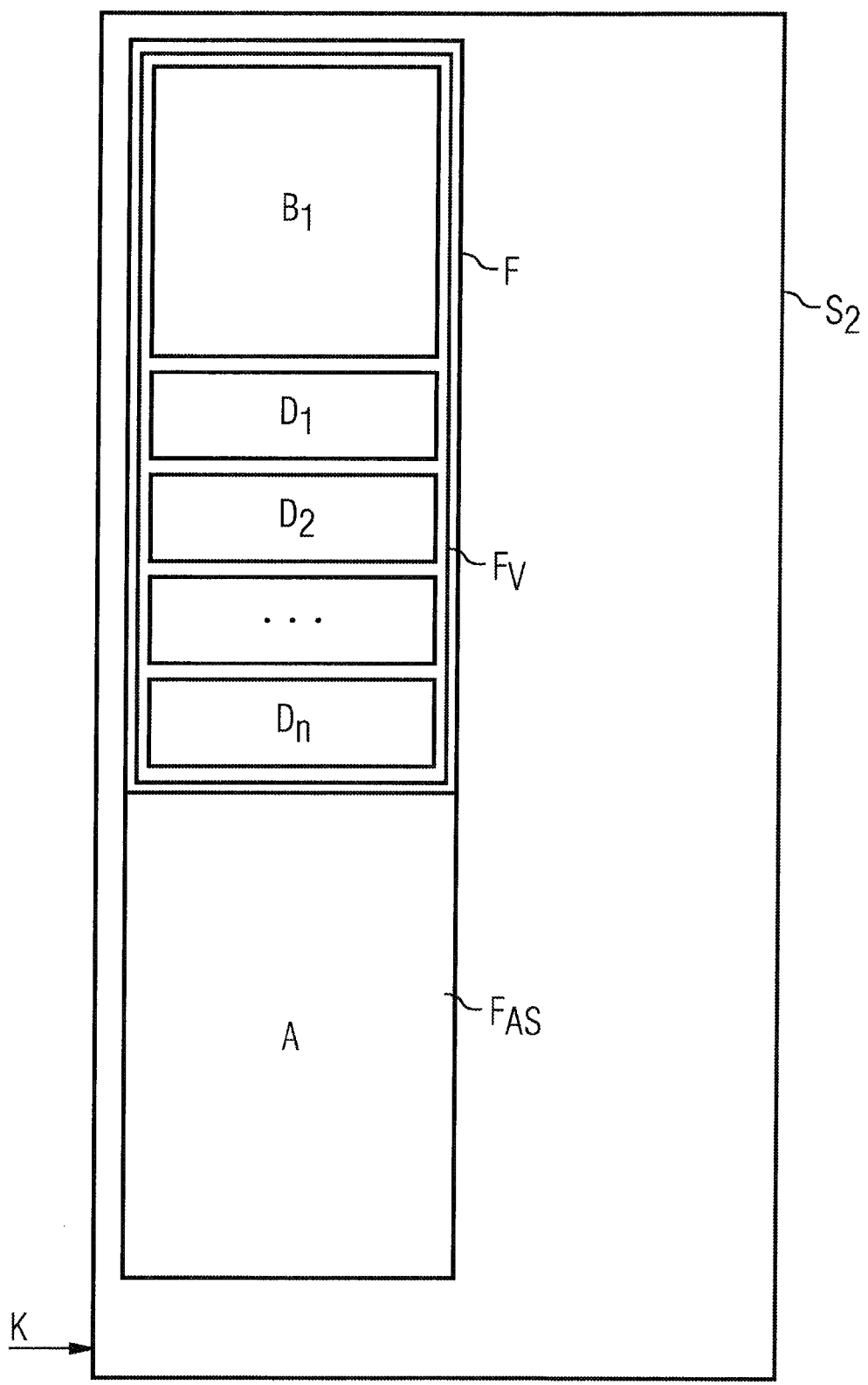
FIG. 2 shows a schematic block diagram of a second embodiment of a control device.

In a second example of a control device $S_2$, which is shown in FIG. 2, a common memory F incorporates the main memory AS and the variant memory V.

In this and the following example, functionally similar components are denoted by the same reference characters. The descriptions of the two subsequent examples will essentially detail the differences as compared to the first example.

In this example, the memory module F has two memory areas, a first memory area $F_V$ for the variant memory V and a second memory area $F_{AS}$ for the main memory AS. In contrast to the first example of the control device $S_1$, in the second example of the control device $S_2$ the main memory and the variant memory are combined in a memory module F implemented e.g. as an ECC flash memory element.

Figure 3:
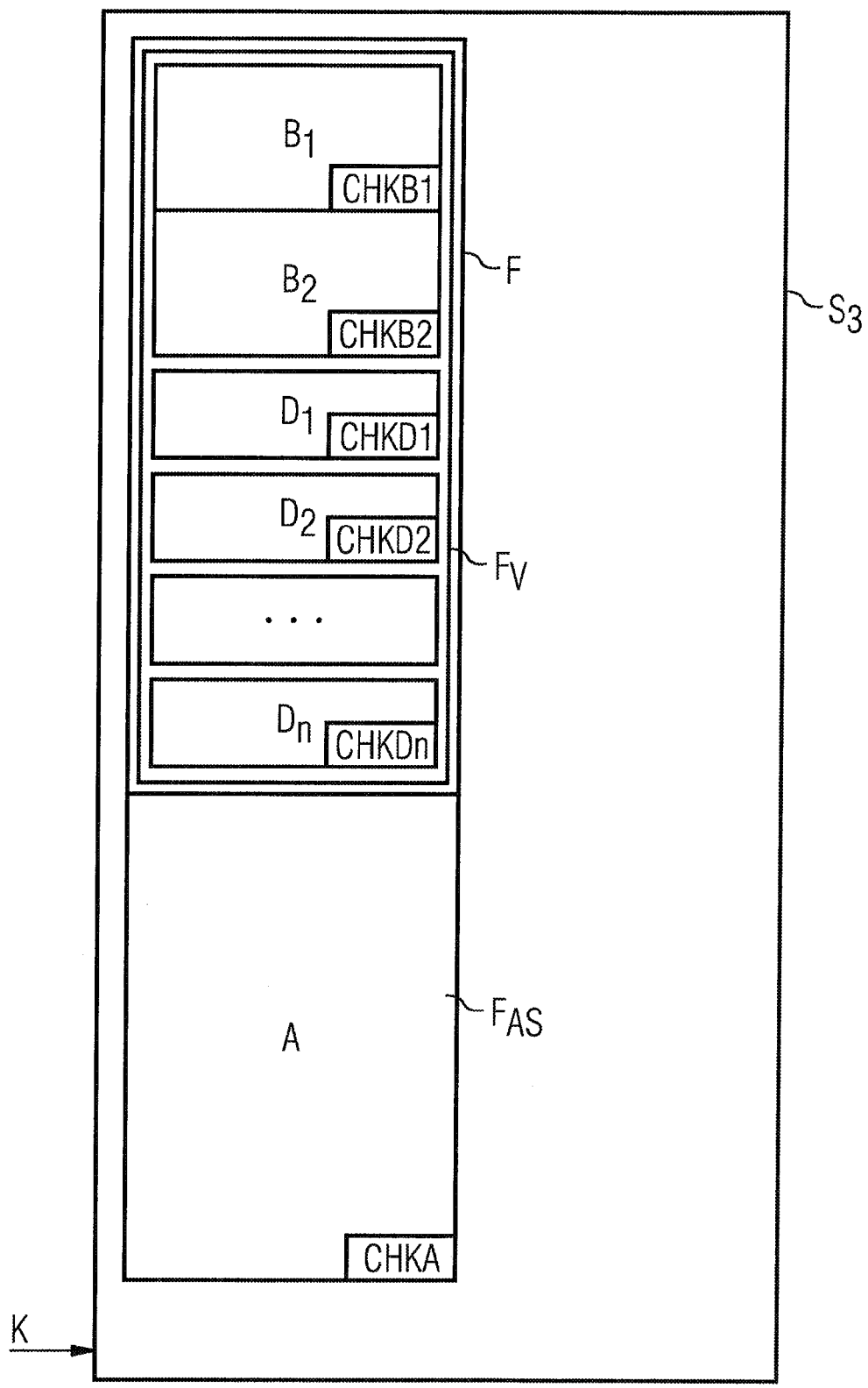
FIG. 3 shows a schematic block diagram of a third embodiment of the control device.

FIG. 3 shows a third example of a control device $S_3$. This example largely corresponds to the example shown in FIG. 2. Here, however, the variant memory V which resides in the memory area $F_V$ contains two basic data records $B_1$ and $B_2$ which can each be combined with different difference data records $D_1, D_2, \ldots, D_N$. In this example, each of the basic data records B and difference data records D has a checksum CHK which is provided in each case with the index of the respective basic and difference data record.

The working data record A which is stored in the main memory AS, in this case in the memory area $F_{AS}$, also has a checksum CHKA.

For creating a working data record, the checksum CHK is calculated either from the checksums of the basic data record and the difference data records combined therewith, or alternatively one of the difference data records D contains a checksum corresponding to the checksum of the working data record A created.

For the control device as shown in FIG. 3, it has been found advantageous for the control device $S_3$ as-supplied to have the most frequently used working data record A stored in the memory area $F_{AS}$. The second and third most frequently used variants are stored in the variant memory area $F_V$ as basic data records $B_1$ and $B_2$. If the control device S3 is supplied in this condition, no new working data record needs to be created in the case of the standard variant.

In the case of the second and third most frequent variant, only the basic data record $B_1$ or the basic data record $B_2$ needs to be copied to the main memory area $F_{AS}$. Only in the case of rarely used variants is it necessary for a working data record A to be generated from a basic data record B and the associated difference data records D, thereby further reducing the programming time of the control device $S_3$.

The invention claimed is:

1. A method of configuring a control device, comprising the following steps:
    reading in an identification code;
    creating a working data record from a basic data record specific to the identification code or from a basic data record specific to the identification code and at least one difference data record specific to the identification code, wherein the basic data record and the difference data record are stored in a variant memory in the control device; and
    transferring the working data record to a main memory of the control device and performing error correction when the working data record is transferred from the variant memory to the main memory.

2. The method according to claim 1, which comprises erasing the main memory prior to the transferring step.

3. The method according to claim 1, wherein the basic data record and/or the difference data records are present in compressed form in the variant memory and the method further comprises decompressing the basic data record and/or the difference data records when the working data record is created.

4. The method according to claim 1, wherein the basic data record and the difference data record are recursively combined.

5. The method according to claim 1, which comprises creating the working data record in the control device.

6. The method according to claim 1, which comprises comparing a content of the main memory and/or of the variant memory with a predefined checksum.

7. A computer program with computer-executable instruction code for carrying out the method according to claim 1 when the program is executed on a computer or on a computer network.

8. A machine-readable data carrier having stored thereon a computer program with computer-executable instruction code which, when read into a memory of a computer, causes the computer to carry out the method according to claim 1.

9. A data carrier having stored thereon a data structure which, upon having been loaded to a main memory or a primary memory of a computer or a computer network, is configured to carry out the method according to claim 1.

10. A computer program product with computer-executable instruction code stored on a machine-readable carrier for executing the method steps according to claim 1 when the program is read into a working memory of and executed on a computer or on a computer network.

11. A control device, comprising:
    a main memory for a working data record;
    a variant memory of the control device having a basic data record specific to a particular identification code and at least one difference data record specific to a particular identification code, a working data record being creatable from a basic data record and a difference data record; and
    the control device programmed to transfer the working data record to said main memory and perform error correction when the working data record is transferred from said variant memory to said main memory.

12. The control device according to claim 11, wherein said at least one difference data record is one of a plurality of difference data records stored in said variant memory.

13. The control device according to claim 11, wherein said main memory is an ECC flash memory.

14. The control device according to claim 11, wherein said main memory, in an initial state thereof, contains an initial data record enabling the control device to be operated in an as-supplied condition.

15. The control device according to claim 14, wherein a basic data record or a combination of a basic data record and at least one difference data record corresponds to the initial data record.

16. The control device according to claim 11, wherein the control device is configured to create the working data record.

17. An application-specific integrated circuit, comprising the main memory and the variant memory according to claim 11.

* * * * *